UNITED STATES PATENT OFFICE.

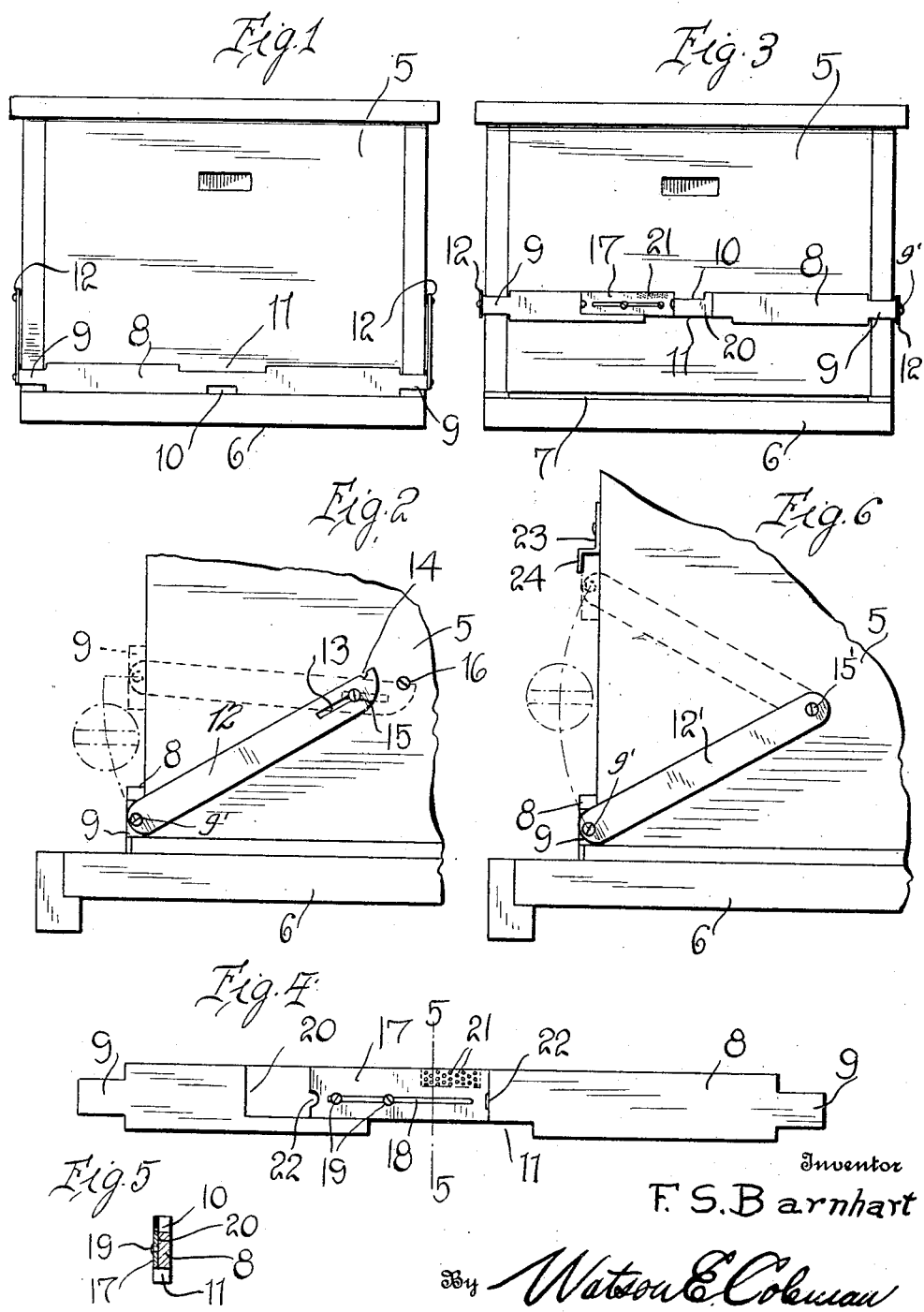

FRED S. BARNHART, OF CHICO, CALIFORNIA.

BEEHIVE.

1,198,513. Specification of Letters Patent. Patented Sept. 19, 1916.

Application filed April 1, 1915. Serial No. 18,560.

*To all whom it may concern:*

Be it known that I, FRED S. BARNHART, a citizen of the United States, residing at Chico, in the county of Butte and State of California, have invented certain new and useful Improvements in Beehives, of which the following is a specification, reference being had to the accompanying drawings.

This invention relates to bee hives, and has for its primary object to provide an adjustable entrance for bee hives whereby the size of the entrance opening to the interior of the hive may be increased or decreased so as to protect the colony of bees against the effects of low temperatures and to also prevent robbing of the hive and killing of the bees by moths or other preying insects.

The invention has for another and more particular object to provide an improved mounting of the adjustable entrance bar or slide and means for locking or holding the same in a raised position so as to permit of the entrance or exit of the bees throughout the entire length of the entrance opening.

It is an additional object of my invention to provide a very simple and effective device for the above purpose, which may be easily and quickly adjusted, and is of great convenience and utility in practical operation.

With the above and other objects in view, my invention consists in the novel features of construction, combination, and arrangement of parts to be hereinafter more fully described, claimed, and illustrated in the accompanying drawing, in which, Figure 1 is an end elevation of a bee hive provided with my improved adjustable entrance; Fig. 2 is a fragmentary side elevation thereof on an enlarged scale, showing the entrance bar locked in its raised position, in dotted lines, and also illustrating an intermediate position of the entrance bar; Fig. 3 is a view similar to Fig. 1, showing the reverse position of the entrance bar and the same locked in its raised or elevated position; Fig. 4 is an enlarged detail elevation of the entrance bar, showing the adjustable slide which is provided for the purpose of entirely closing the entrance when it is desired to move the hive or when the bees have become weakened by the intrusion of robbing insects; Fig. 5 is a section taken on the line 5—5 of Fig. 4; and Fig. 6 is a fragmentary side elevation, similar to Fig. 2, showing a slightly modified mounting of the adjustable entrance bar.

Referring in detail to the drawing, 5 designates the body of the bee hive which may be of any approved construction, and includes a suitable base 6. The lower edge of one of the end walls of the hive body is spaced above the base to provide an entrance opening indicated at 7, which extends across the entire width of the interior of the hive. It is to born in mind, however, as will be fully developed in the following explanation, that the invention forming the subject matter of the present application is applicable as well to other hive constructions than that above referred to.

In the form of the device illustrated in the accompanying drawing, an entrance bar or slat 8 is employed, which is of a length substantially equivalent to the width of the hive. In one form of this bar, as shown, the same is provided with the reduced end portions 9 owing to the peculiar hive construction. One of the longitudinal edges of the bar 8 is centrally provided with a recess, indicated at 10, while the other longitudinal edge of said bar is also provided with a relatively long recess 11 in opposed relation to the recess 10.

In the preferred mounting of the adjustable entrance bar 8, metal link members 12 are provided which are pivotally connected at one of their ends to the bar 8 by pivot screws 9' so that the entrance bar may freely rotate between said link members. These members extend along the exterior faces of the opposite side walls of the hive body and are provided in their other ends with longitudinally extending slots 13, and at these latter ends of the links, notches 14 are formed in the upper edges thereof. Screws or studs 15, fixed in the side walls of the hive body, are disposed through the slots 13 of the links so that said links may slide on said studs. Locking screws or pins 16 are also fixed in the body walls of the hive for engagemnt in the notches 14 in the upper edges of the link members.

Referring now to Figs. 1 and 2 of the drawings, it will be understood that when the entrance bar 8 is in its lowered position, the same rests upon the base 6 in front of the enrance opening 7 and one of the recesses 10 or 11 is in registration with this entrance opening. The remaining portions of the entrance opening at opposite sides of the recess, are closed by the bar 8. In winter, when depredations by preying insects are not likely to occur, the longer slot 11 will be disposed in opposed relation to the central portion of the entrance opening 7 so that the bees may have free entrance or exit, while at the same time, the temperature of the interior of the hive will be higher than the atmospheric temperature owing to the fact that the greater portion of the entrance opening will be closed. In summer, the bar 8 is raised or elevated to the position shown in dotted lines in Fig. 2, wherein the same is disposed above the base 6 of the hive and in engagement against the end wall thereof. In this movement of the entrance bar, the links 12 are shifted upon the pins 15, and the locking pins or studs 16 seat in the notches 14 in the upper edges of the locking members, thereby sustaining and locking the links and the adjustable entrance bar in their elevated positions. Thus, during the honey season, the entrance 7 is entirely open and unobstructed so that the bees may have free ingress or egress. In order to prevent robbing of the hive by moths or other preying insects of like nature, the entrance bar 8 is turned between the ends of the link members 12 so that the shorter recess 10 thereof will be downwardly disposed, and when the bar is in its lowered position, in registering relation with the entrance opening 7, thus restricting the size of this opening so that the robbing insects will be effectually excluded.

Sometimes, as when the hive is moved from place to place, or the bees have become weakened by the invasions of their enemies, it becomes necessary to entirely close the entrance opening, in so far as any communication with the interior of the hive thereto is concerned. To this end, I provide a slide plate 17 which is mounted upon one face of the bar 8, one edge of such slide plate being in a plane coincident with the longitudinal edge of the slot 11, and the other edge thereof being flush with the opposite longitudinal edge of said bar. The face of the bar is recessed or longitudinally channeled, as shown at 18, so that the outer face of the plate 17 will be flush with the face of the bar. In the bar 8, spaced guide pins 19 are fixed, which extend through a longitudinal slot 20 in the plate 17. This plate, in one end and adjacent to its outer longitudinal edge, is provided with a plurality of minute openings 21 for the purpose of admitting air to the interior of the hive. The opposite end of the plate is provided with notches 22 so that the finger may be conveniently engaged therewith in order to slide the plate longitudinally upon the bar 8. When it is necessary to completely close the entrance 7 to the hive, the plate 17 is shifted to the position shown in Fig. 4, wherein the openings 21 are opposed to the smaller recess 10 in the edge of the bar 8. The bar is then turned so that the plate 17 will be opposed to the end wall of the hive and the recess 10 downwardly disposed. This turning movement of the bar is permissible when the bar is slightly elevated above the base, as indicated in dash lines in Fig. 2. The bar is then lowered so that its lower edge will rest upon the base 6. It will thus be apparent that the entrance opening 7 is entirely closed so that the bees cannot escape from the hive nor can other insects enter the same. At the same time, however, the small openings or perforations 21 in the plate 17 provide for the proper ventilation of the interior of the hive.

In Fig. 6 of the drawing, I have shown a slightly modified manner of retaining the adjustable entrance bar in its raised or elevated position upon the hive body. In this construction, the link members 12' between which the entrance bar is mounted, are permanently pivoted at their inner ends, as shown at 15', upon the side walls of the hive. To the end wall of the hive, one or more resilient catch members 23 are secured, said members being of angular formation and having depending flanges 24. When the entrance bar is swung upwardly and inwardly against the end wall of the hive, the flanges 24 are sprung outwardly so that they will engage over the outer face of said bar and resiliently clamp upon the same, whereby the bar is held in such elevated position. It is apparent that various other devices might be provided for retaining the adjustable entrance bar in its raised position, and I do not, therefore, desire to be limited, in the practical development of my invention, to any specific type of such holding or locking devices.

From the foregoing description, taken in connection with the accompanying drawing, it is thought that the construction, manner of operation, and several advantages of my invention, will be clearly and fully understood.

The device provides means for easily and quickly varying the size of the entrance opening through which the bees may find ingress or egress to or from the hive, and permits the apiarist to affectively safe-guard the bees and prevent the robbery of the hive by the effective exclusion of depredating insects.

As hereinbefore mentioned, the present invention is of such construction that the same is readily applicable to various hive constructions, and it may be additionally pointed out that, in furtherance of this purpose, the adjustable slide plate 17 may be mounted upon the entrance bar in various other ways from that above referred to. It will accordingly be understood that I also reserve the privilege of adopting various modifications in this connection and also of resorting to changes in the form, proportion, and relative arrangement of the several coöperating elements as may be fairly embodied within the spirit and scope of the invention as claimed.

Having thus fully described my invention, what I desire to claim and secure by Letters Patent is:—

1. The combination with a bee hive having an entrance opening, supporting means pivotally mounted upon the body of the hive for movement in a vertical plane, and a bar rotatably mounted upon the supporting means and provided with a plurality of recesses of relatively different lengths, said bar being adapted for rotation in one position of the supporting means whereby any one of the recesses therein may be disposed for registration with the entrance opening to the hive while the remaining portion of said opening is closed.

2. The combination with a bee hive provided with an entrance opening, vertically movable supports mounted upon the hive body, a bar rotatably mounted in said supports and provided in its opposite longitudinal edges with recesses of relatively different lengths, said bar being adapted for rotation to dispose any one of the recesses in position for registering relation with the entrance opening in the normal position of said bar, and means for retaining the bar and its supports in an elevated position upon the hive body.

3. The combination with a bee hive provided with an entrance opening in one end, of link members pivotally mounted upon the sides of the hive body for vertical movement, a bar rotatably mounted in the free ends of said link members and provided in its opposite longitudinal edges with recesses of relatively different lengths, said bar in one position of the link members being adapted for rotation to dispose either of the recesses in position to register with the entrance opening when the bar is lowered to its normal position.

4. The combination with a bee hive provided with an entrance opening in one end, of link members pivotally mounted upon the sides of the hive body for vertical movement, a bar rotatably mounted in the free ends of said link members and provided in its opposite longitudinal edges with recesses of relatively different lengths, said bar in one position of the link members being adapted for rotation to dispose either of the recesses in position to register with the entrance opening when the bar is lowered to its normal position, and means for retaining the rotatable bar in an elevated position against the end of the hive body.

5. The combination with a bee hive provided with an entrance opening in one end, of link members pivotally mounted upon the sides of the hive body for vertical movement, a bar rotatably mounted in the free ends of said link members and provided in its opposite longitudinal edges with recesses of relatively different lengths, said bar in one position of the link members being adapted for rotation to dispose either of the recesses in position to register with the entrance opening when the bar is lowered to its normal position, and means fixed to the hive body for engagement by the link members to hold the same in a raised position and retain the rotatable bar against the end of the hive body.

6. The combination with a bee hive provided with an entrance opening in one end, of link members pivotally and slidably mounted upon the sides of the hive body and projecting beyond the ends thereof, a rotatable bar mounted in the latter ends of the link members for engagement against the end of the hive body in the normal position of the link members or when the same are raised to an approximately horizontal position, said bar being provided with recesses in its opposite edges of relatively different lengths and adapted to be rotated in an intermediate position of the link members to dispose any one of said recesses in position for registration with the entrance opening when the bar is lowered to its normal position.

7. The combination with a bee hive provided with an entrance opening in one end, of link members, guides fixed to the hive body upon which the link members are engaged at one of their ends for sliding and pivotal movement, a bar rotatably mounted in the other ends of said link members, said bar in its normal position resting upon the base of the hive and in engagement with the end wall thereof, said link members being adapted to be raised and extended to permit of the rotation of said bar, said bar having recesses in its opposite edges of relatively different lengths any one of which is adapted to register with the entrance opening of the hive when the bar is in its normal position, said link members being adapted to be further elevated and moved inwardly upon the hive body to dispose the bar above the entrance opening and in engagement with the end of the hive, and means with which said link members are adapted to engage to retain the bar in the latter position.

8. The combination with a bee hive having an entrance opening, of supports mounted for swinging movement upon the hive body, and reversible means mounted in the supports to partially close the entrance opening and vary the size of the same affording ingress to or egress from the interior of the hive.

9. The combination with a bee hive having an entrance opening, of supports mounted for swinging movement upon the hive body, a reversible rectangular bar rotatably mounted in the supports, said bar engaging the wall of the hive and limiting the swinging movement of the supports and being provided with means to vary the extent of the entrance opening to the hive when the bar is in its normal position, and means for sustaining the bar in an elevated position above the entrance opening and against the wall of the hive.

10. The combination with a bee hive having an entrance opening in one end, of supports mounted for vertical swinging movement upon the hive body, a reversible entrance bar rotatably mounted in said supports and limiting the movement of the supports in each direction by contact with the end wall of the hive, said bar being provided with means to vary the exposed extent of the entrance opening affording ingress to or egress from the hive, and means for engagement with the supports to sustain the bar in an elevated position above the entrance opening and against the wall of the hive.

11. The combination with a bee hive having an entrance opening in one end, of a rotatably mounted bar supported upon the exterior of the hive for limited bodily movement with respect thereto, said bar, by contact with the wall of the hive at the end of its movement in each direction, being held against rotation and capable of rotation only when in an intermediate position, whereby the bar may be reversed, said bar having means to vary the exposed extent of the entrance opening affording ingress to or egress from the hive, and means for sustaining the entrance bar in an elevated inoperative position against the hive wall.

In testimony whereof I hereunto affix my signature in the presence of two witnesses.

FRED S. BARNHART.

Witnesses:
C. L. STILSON,
ELEANOR F. STILSON.

Copies of this patent may be obtained for five cents each, by addressing the "Commissioner of Patents, Washington, D. C."